United States Patent
Fujii et al.

(10) Patent No.: US 7,174,299 B2
(45) Date of Patent: Feb. 6, 2007

(54) SPEECH RECOGNITION SYSTEM, SPEECH RECOGNITION APPARATUS, AND SPEECH RECOGNITION METHOD

(75) Inventors: Kenichi Fujii, Kanagawa (JP); Yuji Ikeda, Kanagawa (JP); Takaya Ueda, Kanagawa (JP); Fumiaki Ito, Kanagawa (JP); Tomoyuki Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 09/972,996

(22) Filed: Oct. 10, 2001

(65) Prior Publication Data

US 2002/0046023 A1    Apr. 18, 2002

(30) Foreign Application Priority Data

Oct. 11, 2000 (JP) ............................. 2000-311098
Dec. 12, 2000 (JP) ............................. 2000-378019

(51) Int. Cl.
*G01L 15/00* (2006.01)
(52) U.S. Cl. ......................................... 704/275; 704/270
(58) Field of Classification Search ................ 704/270, 704/251, 275
See application file for complete search history.

(56) References Cited

U.S. PATENT DOCUMENTS 5,632,002 A * 5/1997 Hashimoto et al. ......... 704/231
6,112,174 A * 8/2000 Wakisaka et al. .......... 704/251
6,327,568 B1 * 12/2001 Joost ....................... 704/270.1
6,408,272 B1 * 6/2002 White et al. .............. 704/270.1
6,487,534 B1 * 11/2002 Thelen et al. ............... 704/270
6,526,380 B1 * 2/2003 Thelen et al. ............... 704/251

FOREIGN PATENT DOCUMENTS

JP          7-222248         8/1995

* cited by examiner

*Primary Examiner*—Daniel Abebe
(74) *Attorney, Agent, or Firm*—Fitzpatrick, Cella, Harper & Scinto

(57) ABSTRACT

This invention has as its object to provide a speech recognition system to which a client and a device that provides a speech recognition process are connected, which provides a plurality of usable speech recognition means to the client, and which allows the client to explicitly switch and use the plurality of speech recognition means connected to the network. To achieve this object, a speech recognition system of this invention has speech input means for inputting speech at the client, designation means for designating one of the plurality of usable speech recognition means, and processing means for making the speech recognition means designated by the designation means recognize speech input from the speech input means.

4 Claims, 14 Drawing Sheets

FIG. 12

```
<html>
<body>

SELECT ENGINE<BR>
<p><a href=http://engine1.asp>RECOGNITION ENGINE 1</a></p>
<p><a href=http://engine1.asp>RECOGNITION ENGINE 2</a></p>

</body>
</html>
```

FIG. 13

SELECT ENGINE

● RECOGNITION ENGINE 1

○ RECOGNITION ENGINE 2

FIG. 14

```
<HTML>
<HEAD>
<TITLE>SPEECH RECOGNITION SWITCHING</TITLE>
</HEAD>
<BODY>
<%If ret=1 Then %>
END OF ENGINE SELECTION<BR>
ENGINE NAME:enginel<BR>
<% Else %>
ENGINE SELECTION IS NOT SUCCESSFUL<BR>
<% End If %>

</BODY>
</HTML>
```

SPEECH RECOGNITION SYSTEM, SPEECH RECOGNITION APPARATUS, AND SPEECH RECOGNITION METHOD

FIELD OF THE INVENTION

The present invention relates to a speech recognition system which uses a plurality of speech recognition apparatuses connected to a network, a speech recognition apparatus, a speech recognition method, and a storage medium.

BACKGROUND OF THE INVENTION

In recent years, a technique for recognizing speech spoken by a person on a computer in accordance with a predetermined rule (so-called speech recognition technique) has been put into practical applications. Furthermore, a so-called client-server speech recognition system that shares speech recognition with a heavy load by an external speech recognition server having sufficient computer resources and performance upon implementing a speech recognition function on a less powerful portable terminal is used (Japanese Laid-Open Patent No. 7-222248).

On the other hand, a speech input client has been proposed. When the client-server speech recognition system is used, speech recognition that requires a large vocabulary and expert knowledge, and speech recognition that must be done after being connected to the network are made on the server side. However, speech recognition that requires a small vocabulary such as operation of the client side is done on the client to reduce the traffic on the network.

However, in the conventional speech recognition system, which speech recognition means in the client or server is used cannot be determined from input speech data. Furthermore, when a plurality of servers are connected to the speech recognition system, or when one server has a plurality of speech recognition means, and when these servers or speech recognition means can make speech recognition of different languages or that specialized for specific fields, the client cannot explicitly select and use the predetermined server or speech recognition means.

SUMMARY OF THE INVENTION

The present invention has been made in consideration of the above-mentioned problems, and has as its object to provide a speech recognition system which can explicitly select and use a plurality of speech recognition apparatuses connected to a network.

In order to achieve the above object, a speech recognition system of the present invention comprises the following arrangement.

That is, a speech recognition system to which a client and a device that provides a speech recognition process are connected, and which provides a plurality of usable speech recognition means to the client, comprises:

speech input means for inputting speech at the client;

designation means for designating one of the plurality of usable speech recognition means; and processing means for making the speech recognition means designated by the designation means recognize speech input from the speech input means.

A speech recognition method in the speech recognition system of the present invention comprises the following arrangement.

That is, a speech recognition method in a speech recognition system to which a client and a device that provides a speech recognition process are connected, and which provides a plurality of usable speech recognition means to the client, comprises:

the speech input step of inputting speech at the client;

the designation step of designating one of the plurality of usable speech recognition means; and the processing step of making the speech recognition means designated in the designation step recognize speech input in the speech input step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 shows an example of a recognition engine selection script of a server in the speech recognition system according to the present invention;

FIG. 13 shows an example of a recognition engine selection dialog in the speech input client according to the present invention; and FIG. 14 shows an example of a recognition engine selection script of a server in the speech recognition system according to the present invention.

DETAILED DESCRIPTION OF THE PREFERRED EMBODIMENTS

Preferred embodiments of the present invention will be described in detail hereinafter with reference to the accompanying drawings.

[First Embodiment]

Figure 1:
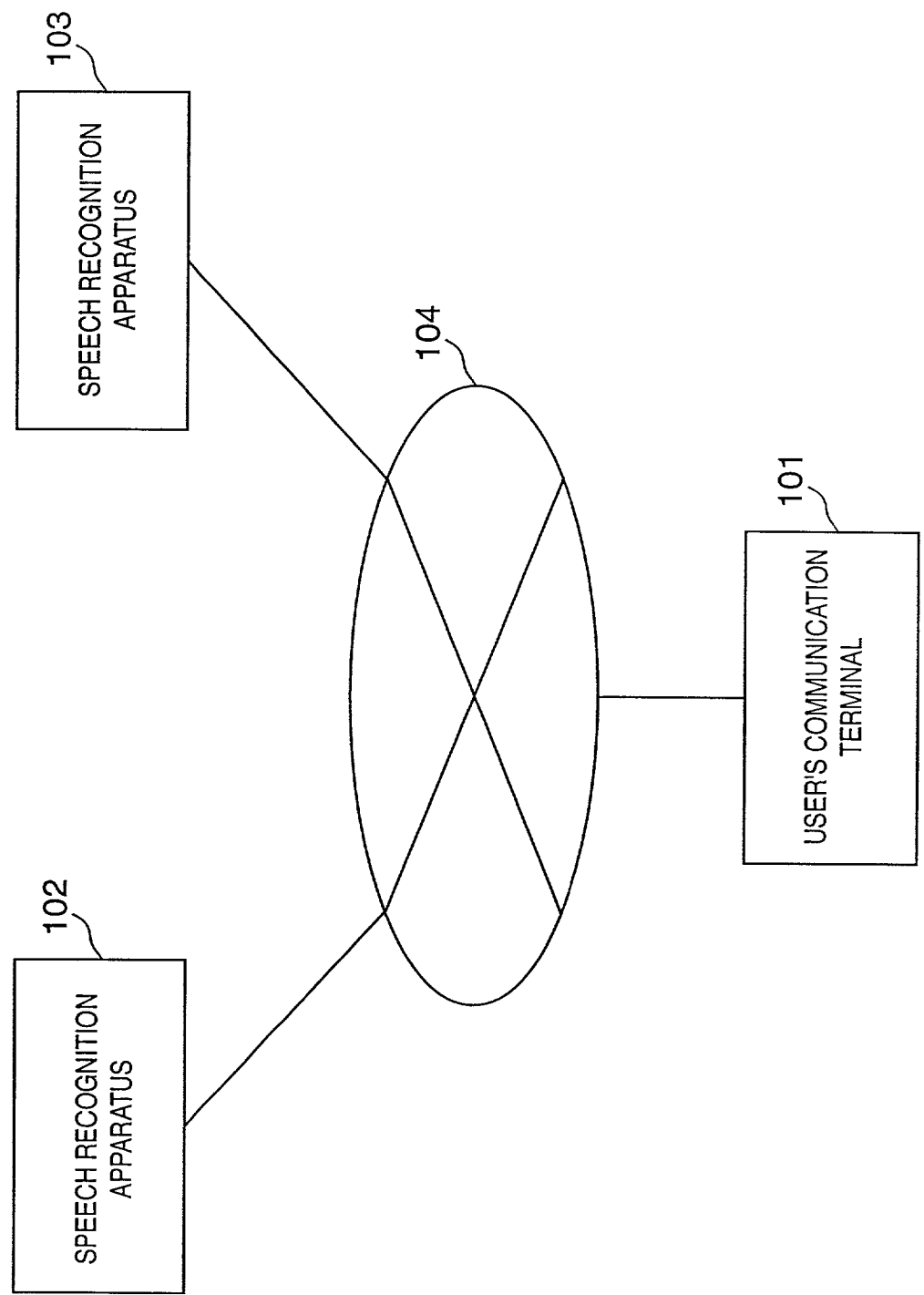
FIG. 1 is a diagram showing the arrangement of a speech recognition system according to an embodiment of the present invention.

FIG. 1 shows the basic arrangement of a speech recognition system according to an embodiment of the present invention.

Referring to FIG. 1, reference numeral 101 denotes a communication terminal such as a mobile computer, portable telephone, or the like, which incorporates a speech recognition program having a small vocabulary dictionary. Reference numerals 102 and 103 denote high-performance speech recognition apparatuses each of which has a large vocabulary dictionary, and which adopt different grammar rules. Reference numeral 104 denotes a network such as the Internet, mobile communication network, or the like.

The communication terminal 101 is an inexpensive, simple speech recognition apparatus with a small arithmetic volume, which has a function of quickly making speech recognition of simple, short words such as "back", "next", and the like. By contrast, the speech recognition apparatuses 102 and 103 are expensive, high-precision speech recognition apparatuses with a large arithmetic volume, which mainly have a function of performing speech recognition of complicated, long, continuous text such as addresses, names, and the like with high precision. In this way, in the speech recognition system of this embodiment, since the speech recognition functions are distributed, a cost reduction of a communication terminal to be provided to the user can be achieved without impairing recognition efficiency, thus improving convenience and portability.

The communication terminal 101 and the speech recognition apparatuses 102 and 103 can make data communications via the network 104. Speech of a given user input to the communication terminal 101 is transferred to the speech recognition apparatus 102 or 103 designated by the user using a keyword. In this embodiment, the keyword for designating the speech recognition apparatus 102 is "input 1", and that for designating the speech recognition apparatus 103 is "input 2". The speech recognition apparatus 102 or 103 recognizes the speech (excluding the keyword) from the communication terminal 101, and sends back a character string obtained by speech recognition to the communication terminal 101.

The arrangement of the communication terminal 101 according to this embodiment will be described below using FIG. 2.

Figure 2:
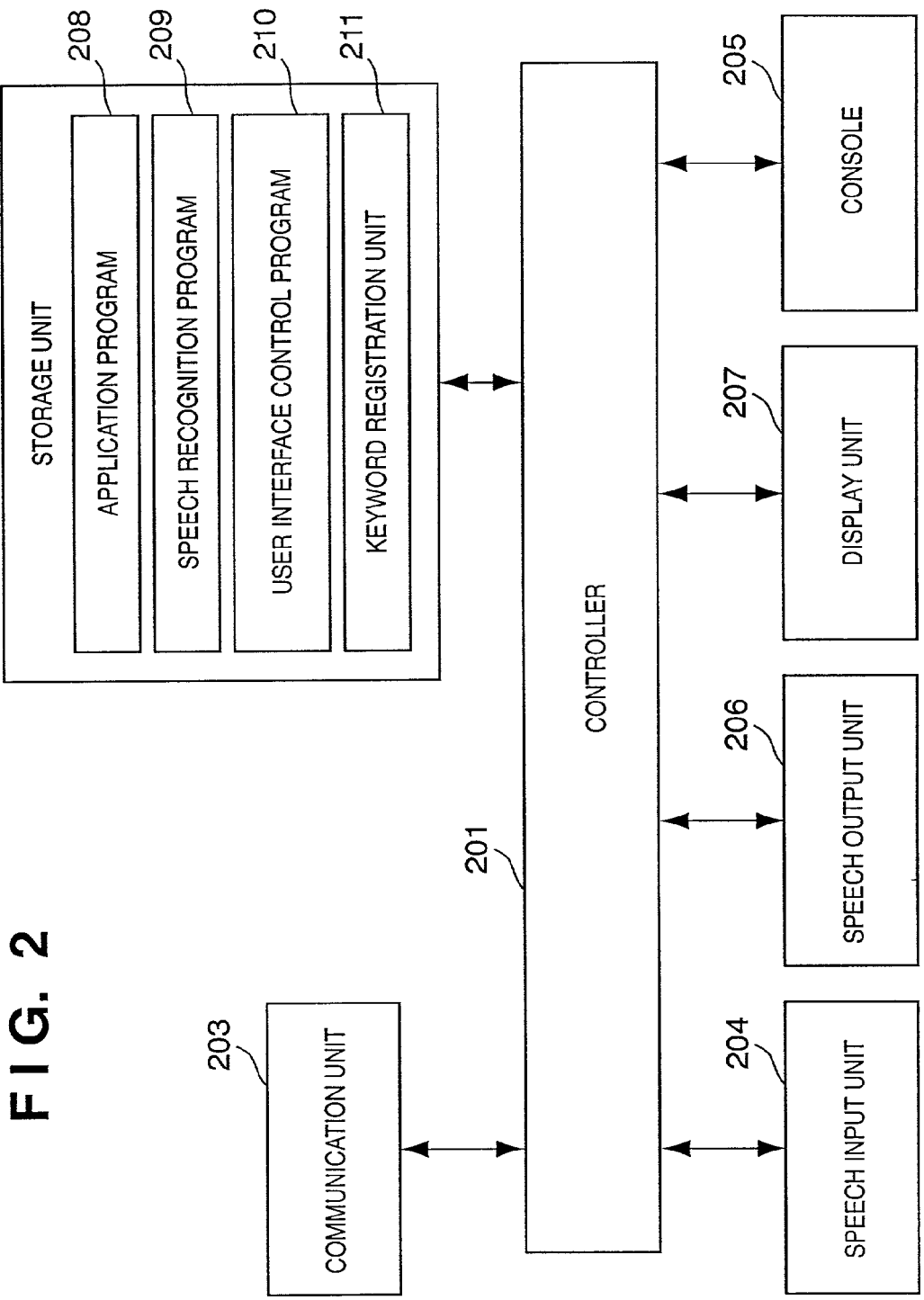
FIG. 2 is a block diagram showing the arrangement of a communication terminal according to the embodiment of the present invention.

Referring to FIG. 2, reference numeral 201 denotes a controller; 202, a storage unit; 203, a communication unit; 204, a speech input unit; 205, a console; 206, a speech output unit; and 207, a display unit. Reference numeral 208 denotes an application program; 209, a speech recognition program; 210, a user interface control program; and 211, a keyword registration unit.

The controller 201 comprises a work memory, microcomputer, and the like, and reads out and executes the application program 208, speech recognition program 209, and user interface control program 210 stored in the storage unit 202.

The storage unit 202 comprises a storage medium such as a magnetic disk, optical disk, hard disk drive, or the like, and stores the application program 208, speech recognition program 209, user interface control program 210, and keyword registration unit 211 in a predetermined area. The communication unit 203 makes data communications with the speech recognition apparatuses 102 and 103 connected to the network 104.

The speech input unit 204 comprises a microphone and the like, and inputs speech spoken by the user. The console 205 comprises a keyboard, mouse, touch panel, joystick, pen, tablet, and the like, and is used to operate a graphical user interface of the application program 208.

The speech output unit 206 comprises a loudspeaker, headphone, or the like. The display unit 207 comprises a display such as a liquid crystal display or the like, and displays the graphical user interface of the application program 208.

The application program 208 has a function of a web browser for browsing information (web contents such as home pages, various data files, and the like) on the network, and the graphical user interface used to operate this function. The speech recognition program 209 is a program having a function of quickly making speech recognition of simple, short words such as "back", "next", and the like. The user interface control program 210 converts a character string obtained as a result of speech recognition using the speech recognition program 209 into a predetermined command, inputs the command to the application program 208, and inputs a character string obtained by speech recognition using the speech recognition apparatus 102 or 103 to the application program 208. The keyword registration unit 211 is used to register keywords for designating the speech recognition apparatuses 102 and 103 connected to the network 104.

Figure 3:
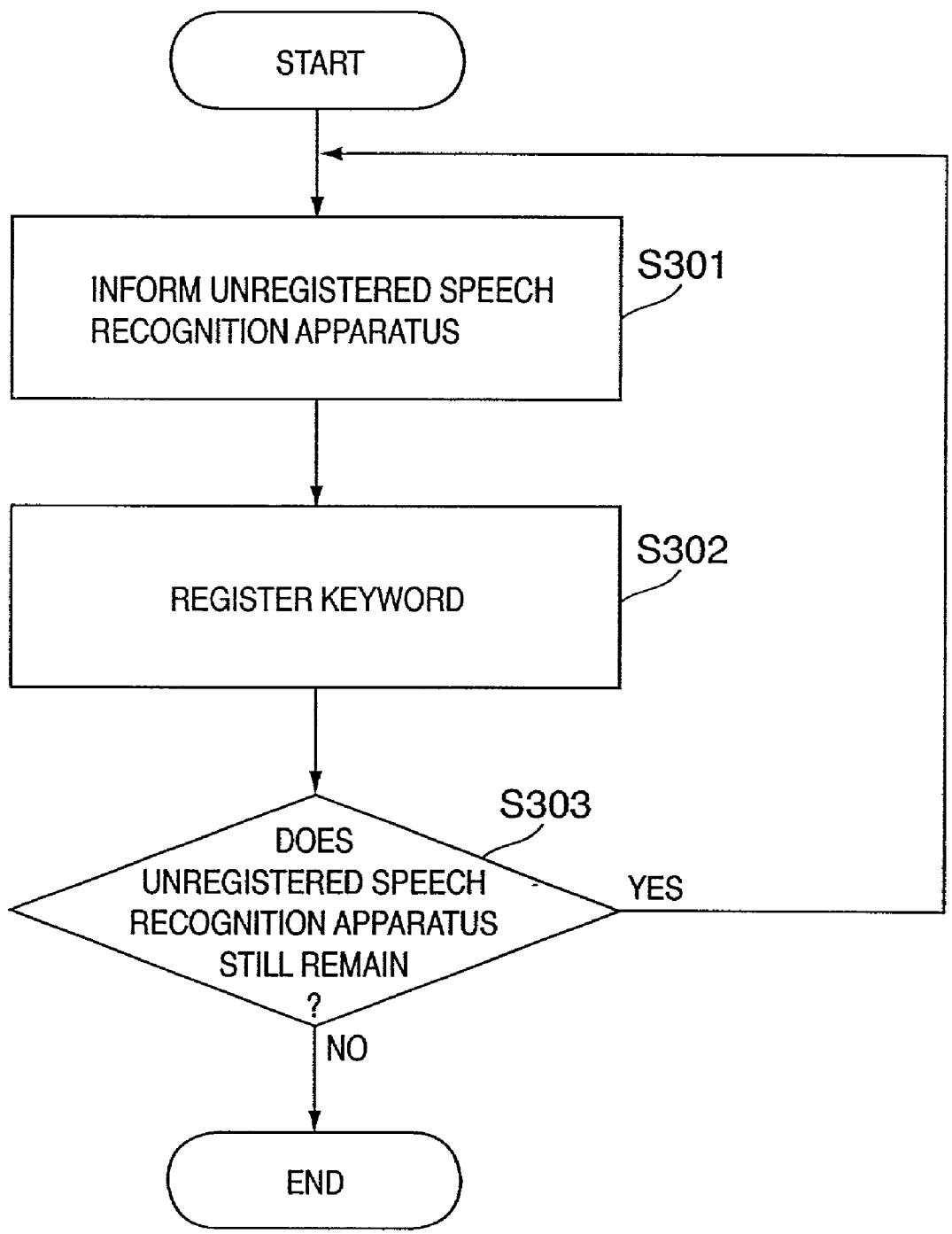
FIG. 3 is a flow chart for explaining a sequence for registering a keyword by the communication terminal according to the embodiment of the present invention.

The sequence for registering keywords for designating the speech recognition apparatuses 102 and 103 by the communication terminal 101 according to this embodiment will be explained below with reference to FIG. 3. This sequence is executed by the controller 201 in accordance with the user interface control program 210 stored in the storage unit 202.

In step S301, the controller 201 informs the user of a speech recognition apparatus, a keyword of which is not registered, using the display unit 207. The user inputs a keyword for designating the speech recognition apparatus 102 or 103 using the console 204. In this embodiment, the keyword for designating the speech recognition apparatus 102 is "input 1", and that for designating the speech recognition apparatus 103 is "input 2".

In step S302, the controller 201 registers the keyword for designating the speech recognition apparatus 102 or 103 in the keyword registration unit 211. The controller 201 checks in step S303 if the keywords of the speech recognition apparatuses 102 and 103 are registered. If the keywords of all the speech recognition apparatuses are registered, the registration process ends.

Figure 4:
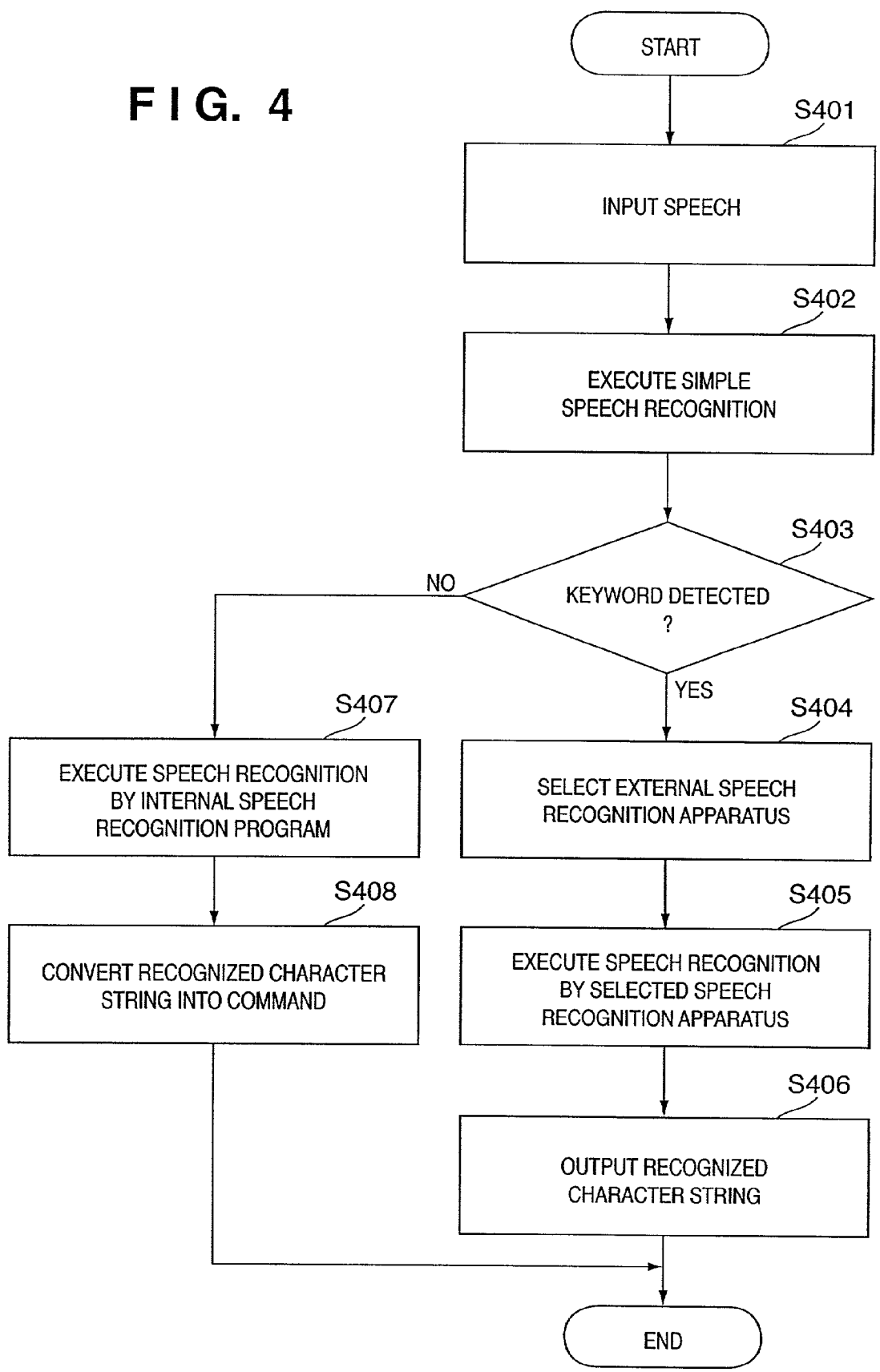
FIG. 4 is a flow chart for explaining a sequence for making speech recognition of input speech by the communication terminal according to the embodiment of the present invention.

The sequence for recognizing input speech using the speech recognition apparatus 102 or 103 connected to the network 104 by the communication terminal 101 according to this embodiment will be explained below with reference to FIG. 4. This sequence is executed by the controller 201 in accordance with the user interface control program 210 stored in the storage unit 202.

In step S401, the controller 201 inputs user's speech input to the speech input unit 204 to the speech recognition program 209. In this embodiment, when speech recognition is executed using the external speech recognition apparatus 102 or 103, the user utters a keyword before he or she utters a character string to be recognized. For example, when speech recognition is executed using the speech recognition apparatus 102, the user utters like "input one (pause) kawasakishi". With this arrangement, the user can consciously select the speech recognition apparatus he or she wants to use, and the communication terminal 101 can easily detect a keyword, thus achieving a high-speed detection process.

In step S402, the controller 201 simply recognizes the speech input in step S401 using the speech recognition program 209, and detects a keyword registered in the keyword registration unit 211 on the basis of the recognized character string.

The controller 201 checks in step S403 if a keyword is detected. If YES in step S403, the flow advances to step S404; otherwise, the flow advances to step S407. For example, if the user utters "input one (pause) kawasakishi nakaharaku imaikamimachi kyanon kosugijigyousho", the keyword "input 1" that designates the speech recognition apparatus 102 is detected, and the flow advances to step S404. If the user utters "back" or "next", since no keyword registered in the keyword registration unit 211 is detected, the flow advances to step S407.

In step S404, the controller 201 selects the speech recognition apparatus 102 or 103 corresponding to the keyword detected in step S402. That is, if the keyword registered in the keyword registration unit 211 is detected, the communication terminal 101 selects one of the plurality of speech recognition apparatuses connected to the network 104, and requests it to execute speech recognition. Therefore, if the user utters "input one (pause) kawasakishi nakaharaku imaikamimachi kyanon kosugijigyousho", the speech recognition apparatus 102 is selected.

In step S405, the controller 201 transmits the speech (except for the keyword) input in step S401 to the speech recognition apparatus 102 or 103 selected in step S403. In this way, since the speech is transmitted except for the keyword, the communication efficiency can be improved, and the speech recognition apparatus 102 or 103 can be prevented from executing speech recognition of an unnecessary portion. The speech recognition apparatus 102 or 103 recognizes the speech from the communication terminal 101, and returns the recognized character string to the communication terminal 101. If the user utters "input one (pause) kawasakishi nakaharaku imaikamimachi kyanon kosugijigyousho", the speech recognition apparatus 102 recognizes a character string "kawasakishi nakaharaku imaikamimachi canon kosugijigyousho", and sends back that character string to the communication terminal 101.

In step S406, the controller 201 inputs the character string recognized by the speech recognition apparatus 102 or 103 to the application program 208. The application program 208 outputs the input character string to a pre-selected input field on the graphical user interface display on the display unit 207.

On the other hand, the controller 201 recognizes the speech input in step S401 using the speech recognition program 209 in step S407. That is, when no keyword registered in the keyword registration unit 211 is detected, the communication terminal 101 automatically executes speech recognition using the internal speech recognition program 209. Therefore, if the user utters "back" or "next", since no keyword is detected, speech recognition is automatically executed using the speech recognition program 209 to obtain a character string "back" or "next".

In step S408, the controller 201 converts the character string recognized by the speech recognition program 209 into a predetermined command, and then inputs the converted command to the application program 208. For example, the character string "back" is converted into a command to go back to the previous browsing page, and the character string "next" is converted into a command to go to the next browsing page. The application program 208 executes a process corresponding to the input command, and displays the execution result on the display unit 207.

As described above, according to this embodiment, inexpensive, simple speech recognition with a small arithmetic volume is executed by the communication terminal provided to the user, and expensive, high-precision speech recognition with a large arithmetic volume is executed by one of the plurality of speech recognition apparatuses connected to the network. Therefore, the communication terminal provided to the user can be arranged with low cost without impairing the recognition efficiency.

According to this embodiment, since one of the plurality of high-precision speech recognition apparatuses connected to the network can be designated by the keyword spoken by the user, the need for complicated manual operations can be obviated. Also, since no dedicated operation button or the like is required, the communication terminal provided to the user can be rendered compact. Especially, convenience and portability of portable terminals such as a mobile computer, portable telephone and the like can be improved.

Furthermore, according to this embodiment, whether the input speech is recognized by the internal speech recognition program or the external speech recognition apparatus can be easily discriminated by checking if the input speech contains a keyword.

In this embodiment, the speech recognition system is constructed using the two speech recognition apparatuses 102 and 103 connected to the network 104. However, the present invention is not limited to such specific arrangement. A speech recognition system can be constructed using three or more speech recognition apparatuses. In this case, the user registers keywords which designate the respective speech recognition apparatuses in the keyword registration unit 211. In order to use one of these speech recognition apparatuses, the user utters the corresponding keyword registered in the keyword registration unit 211. Also, a speech recognition system can be constructed using a speech recognition apparatus having a plurality of different speech recognition units. In this case, the user registers keywords for respectively designating the plurality of different speech recognition units of one apparatus in the keyword registration unit 211. In order to use one of these speech recognition units, the user utters the corresponding keyword registered in the keyword registration unit 211.

Note that the present invention is not limited to the above embodiment, and may be practiced in various other embodiments.

For example, the present invention can be applied to a case wherein an OS (operating system) which is running on the controller 201 executes some or all of processes of the embodiment on the basis of instructions of the user interface control program 210 read out by the controller 201, and the embodiment is implemented by these processes.

Also, the present invention can be applied to a case wherein the user interface control program 210 read out from the storage unit 202 is written in a memory equipped on a function expansion unit connected to the communication terminal 101, a controller or the like equipped on the function expansion unit executes some or all of actual processes on the basis of instructions of that program 210, and the embodiment is implemented by these processes.

[Second Embodiment]

In the first embodiment, whether speech recognition is done by the internal speech recognition program or the external speech recognition apparatus, and which of speech recognition apparatuses is to be used if a plurality of external speech recognition apparatuses are available are automatically switched on the basis of input speech. Alternatively, such switching instruction may be explicitly issued using an operation button or the like.

Note that "explicitly" indicates a state wherein the user can select the speech recognition apparatus of a client or server while observing the display screen of the client.

Figure 5:
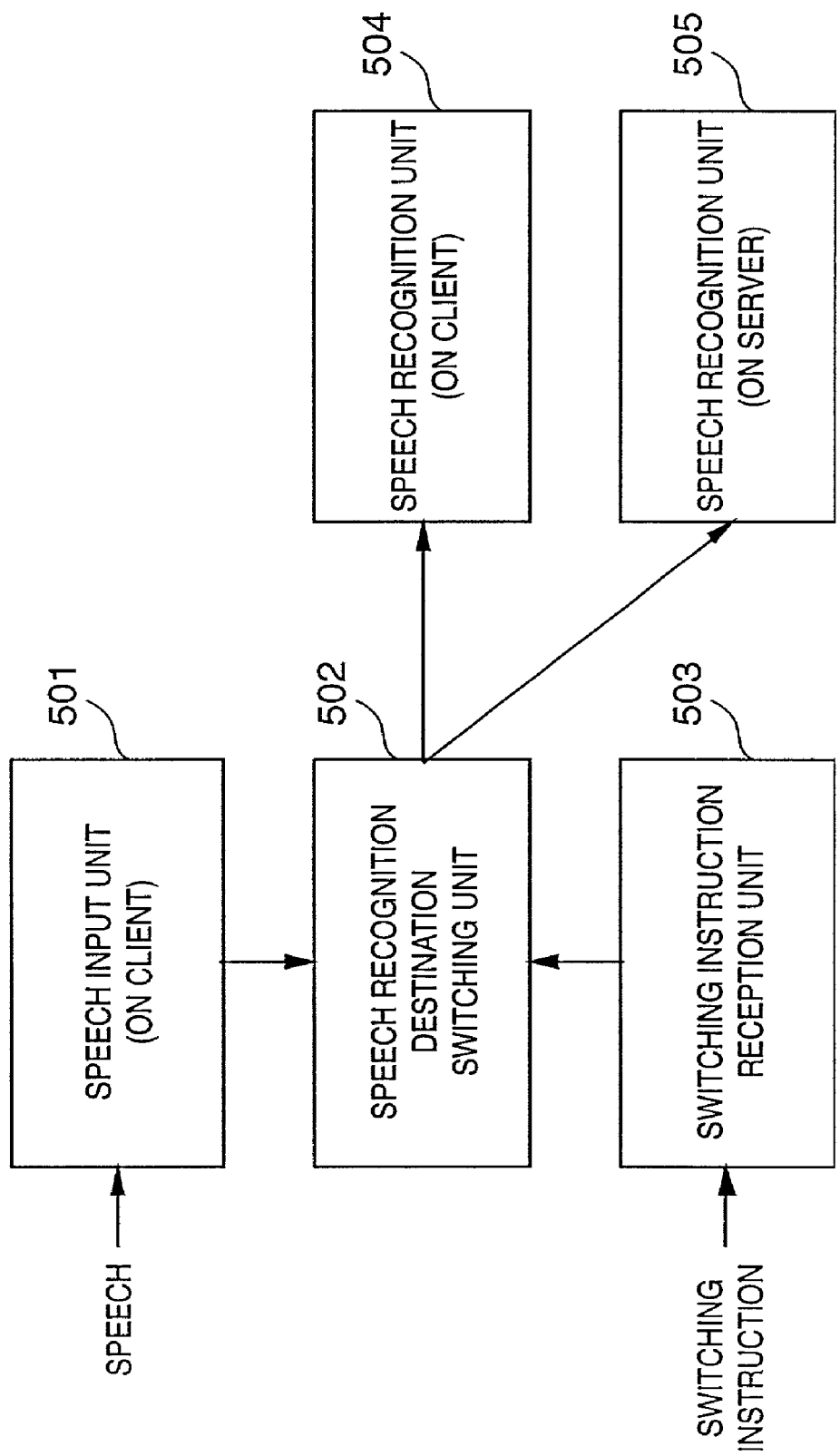
FIG. 5 is a block diagram showing the basic arrangement of an embodiment of a speech input client according to the present invention.

FIG. 5 is a block diagram showing the basic arrangement of a speech recognition system according to the second embodiment of the present invention.

Referring to FIG. 5, reference numeral 501 denotes a speech input unit for generating speech data, which can be recognized by speech recognition units 504 and 505, on the basis of user's input speech. Reference numeral 502 denotes a speech recognition destination switching unit for switching a speech recognition destination of the speech data generated by the speech input unit 501 to the speech recognition unit 504 of a speech input client or the speech recognition unit 505 of a server in accordance with an instruction from a switching instruction reception unit 504. The switching instruction reception unit 503 receives a switching instruction indicating to use one of the speech recognition unit of the speech input client and the speech recognition unit 505 of the server, and sends the switching instruction to the speech recognition destination switching unit 502. Reference numerals 504 and 505 denote speech recognition units which recognize speech data generated by the speech input unit 501. The unit 504 is present on the speech input client, and the unit 505 is present on the server.

Figure 6:
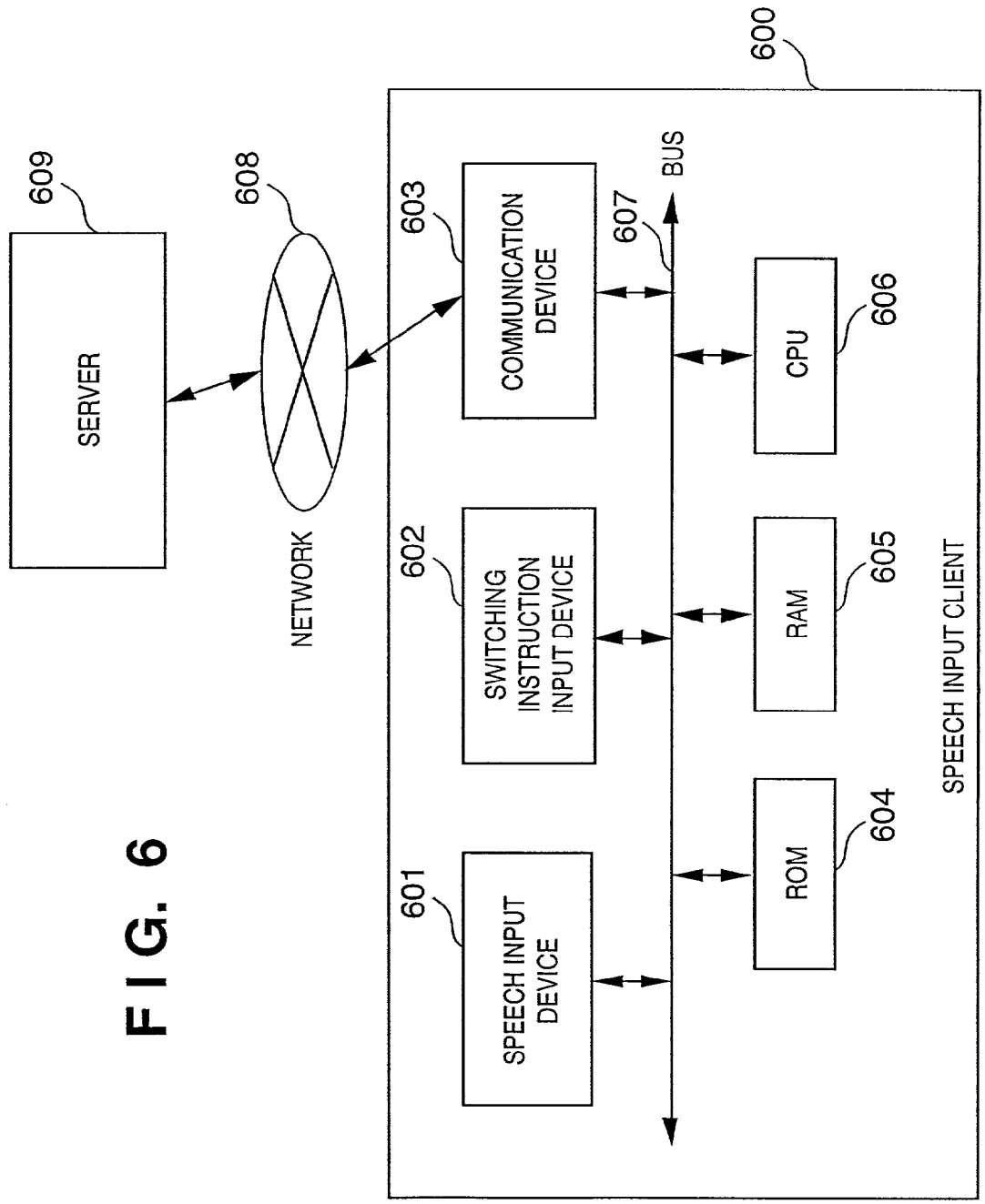
FIG. 6 is a block diagram showing the system arrangement of the embodiment of the speech input client according to the present invention.

FIG. 6 is a block diagram showing the system arrangement of the speech input client according to the second embodiment of the present invention.

In a speech input client 600 shown in FIG. 6, reference numeral 601 denotes a speech input device such as a microphone or the like which acquires speech to be processed by the speech input unit 501. Reference numeral 602 denotes a physical switching instruction input device such as a button, key, or the like on the speech input client, with which the user inputs a switching instruction. Reference numeral 603 denotes a communication device which exchanges data between the speech input client and server. Reference numeral 604 denotes a ROM for storing programs that execute respective processes in FIG. 5. Reference numeral 605 denotes a work RAM used upon executing the programs stored in the ROM 604. Reference numeral 606 denotes a CPU for executing the programs stored in the ROM 604 and RAM 605. Reference numeral 607 denotes a bus for exchanging data by connecting the respective devices of the client. Reference numeral 608 denotes a network for exchanging data by connecting the speech input client and server. Reference numeral 609 denotes a server that can execute speech recognition in a client-server speech recognition system. In this embodiment, one server is connected. A detailed description of the server 609 will be omitted.

Figure 7:
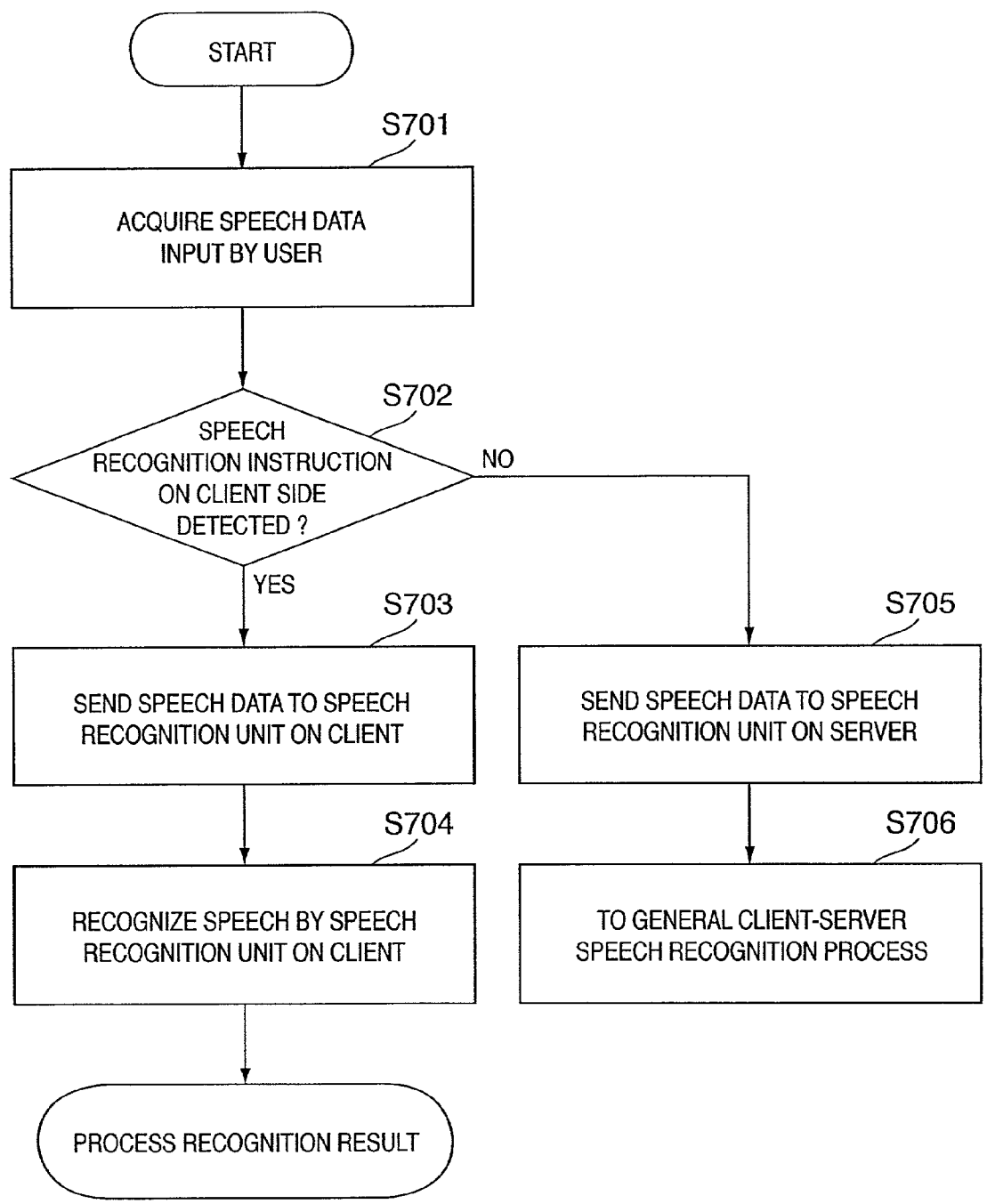
FIG. 7 is a flow chart for explaining the operation of the embodiment of the speech input client according to the present invention.

An outline of the speech recognition system in this embodiment will be explained below using the flow chart shown in FIG. 7.

In step S701, the speech input unit 501 acquires speech input by the user to the speech input device 601 of the speech input client 600 in the form of speech data that the speech recognition units 504 and 505 can recognize. The switching instruction reception unit 503 monitors in step S702 if the user inputs a switching instruction (by, e.g., pressing a button) from the switching instruction input device 602. If the unit 503 receives a switching instruction, the flow advances to step S703; otherwise, the flow advances to step S705. In step S703, the speech recognition destination switching unit 502 transmits the speech data acquired in step S701 to that the speech data undergoes speech recognition in the speech input client 600. In step S704, the speech recognition unit 504 of the speech input client recognizes the input speech data received in step S703. The recognition result process is then executed, but a detailed description of subsequent processes will be omitted.

In step S705, since no switching instruction is issued, the speech recognition destination switching unit 502 does not switch a transmission destination, and transmits the speech data to the server 609 as in the normal client-server speech recognition system, so that the speech data is recognized by the speech recognition unit 505 of the server 609. The recognition result is sent back to the speech input client 600, and is displayed, printed, or output as a comment in the speech input client 600 (step S706). Since the process in step S706 is the same as that in a general client-server speech recognition system, a detailed description thereof will be omitted.

[Third Embodiment]

Figure 8:
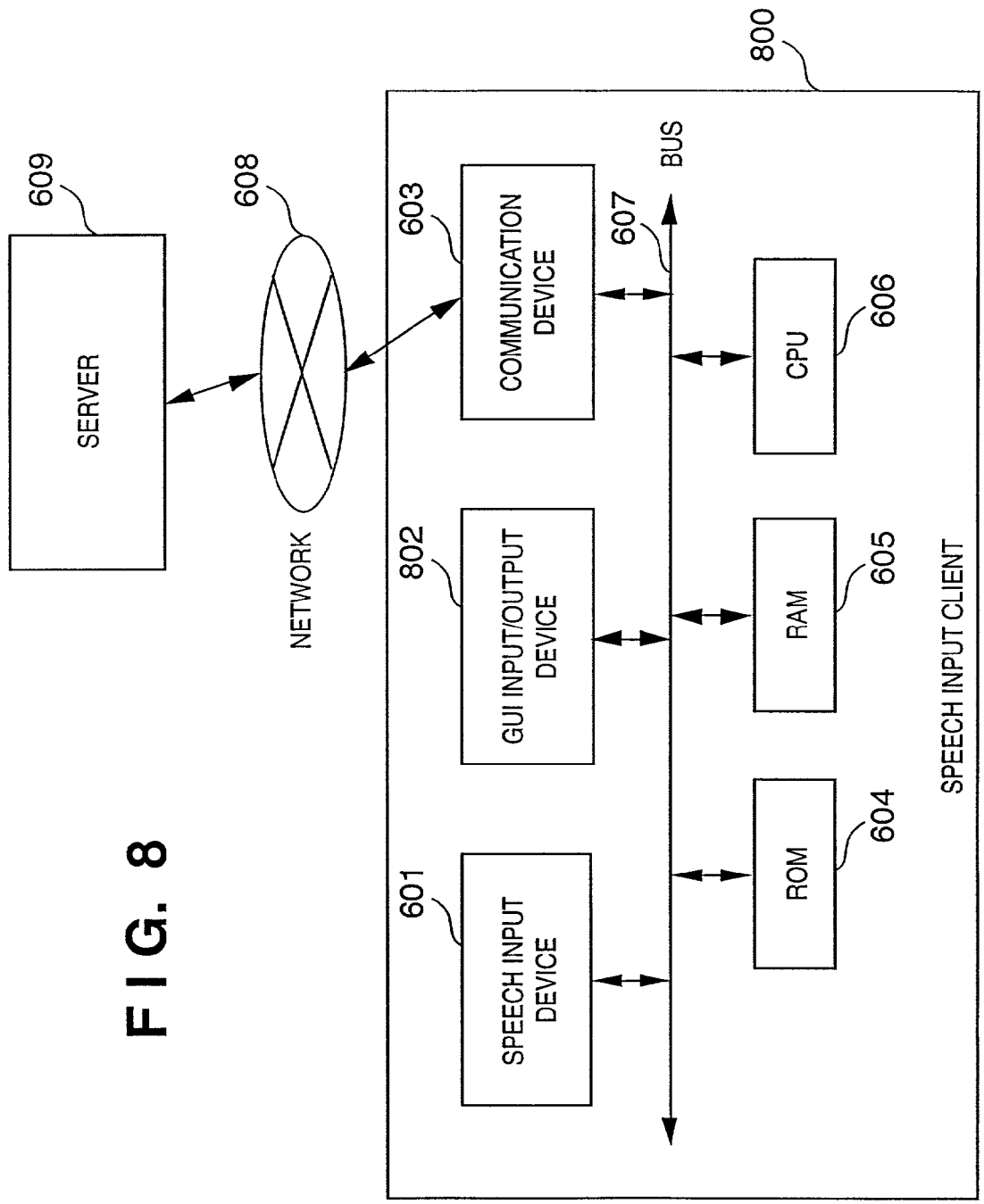
FIG. 8 is a block diagram showing the system arrangement of an embodiment when a display device is provided to the speech input client according to the present invention.
Figure 9:
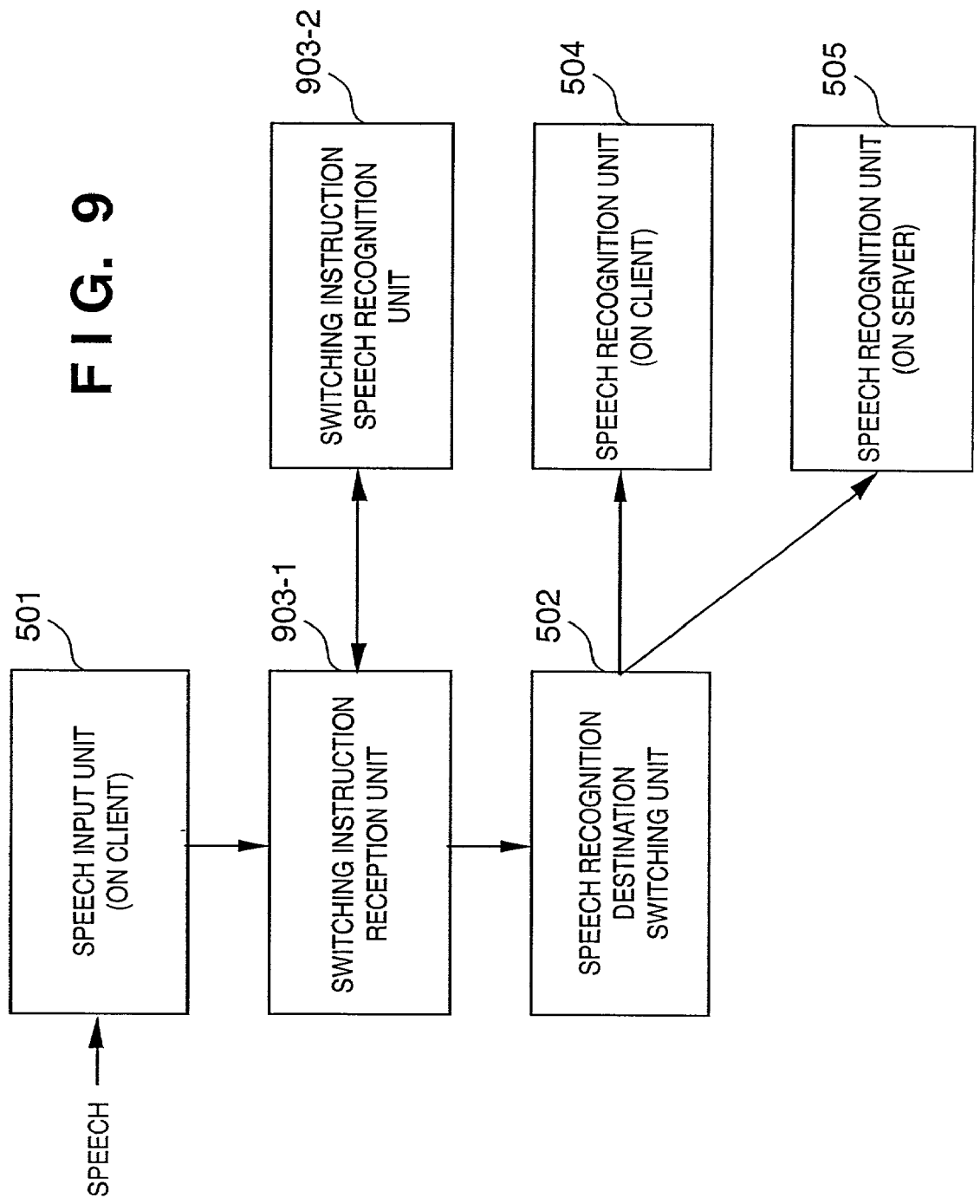
FIG. 9 is a block diagram showing the basic arrangement of an embodiment when a switch instruction speech recognition unit is provided to the speech input client according to the present invention.

In the second embodiment, the physical button is assumed as the input device 602 that the user uses, but the present invention is not limited to such specific device. For example, a system arrangement shown in FIG. 8 may be adopted. More specifically, a speech input client 800 comprises a GUI input/output device 802 in place of the input device 602 in FIG. 6 to provide a graphical user interface (GUI) to the user. The switching instruction reception unit 503 in FIG. 5 processes a switching instruction input on the GUI to switch a speech recognition destination.

[Fourth Embodiment]

In the second embodiment, the button on the speech input client is assumed as the input device 602 that the user uses, but the present invention is not limited to such specific device. For example, the input device 602 may be replaced by a device which receives a radio signal from an external remote controller or the like.

[Fifth Embodiment]

In the second embodiment, in step S701 input speech is converted into a speech data format that the speech recognition units 504 and 505 can recognize. For example, when the server and client use different data formats in speech recognition, the speech recognition destination switching unit 502 may determine a speech recognition destination and then convert the input speech into a speech data format that the selected speech recognition unit can recognize.

[Sixth Embodiment]

In the second embodiment, a switching instruction is issued by only the button. Alternatively, a plurality of switching instruction means may be provided. For example, the user can switch the speech recognition unit using either the button or GUI.

[Seventh Embodiment]

In the second embodiment, one server is assumed. However, a plurality of servers may be present in the network. In this case, the speech recognition destination switching unit can switch a speech recognition unit to be used in accordance with an instruction from the switching instruction reception unit as well as that in the speech input client.

In the above embodiment, both the speech input client and server have speech recognition units. Alternatively, the speech input client may not have any speech recognition client, the server may have a plurality of speech input units or a plurality of servers may be present in the network, and the user may explicitly switch them in accordance with the purpose of input speech.

[Eighth Embodiment]

Figure 10:
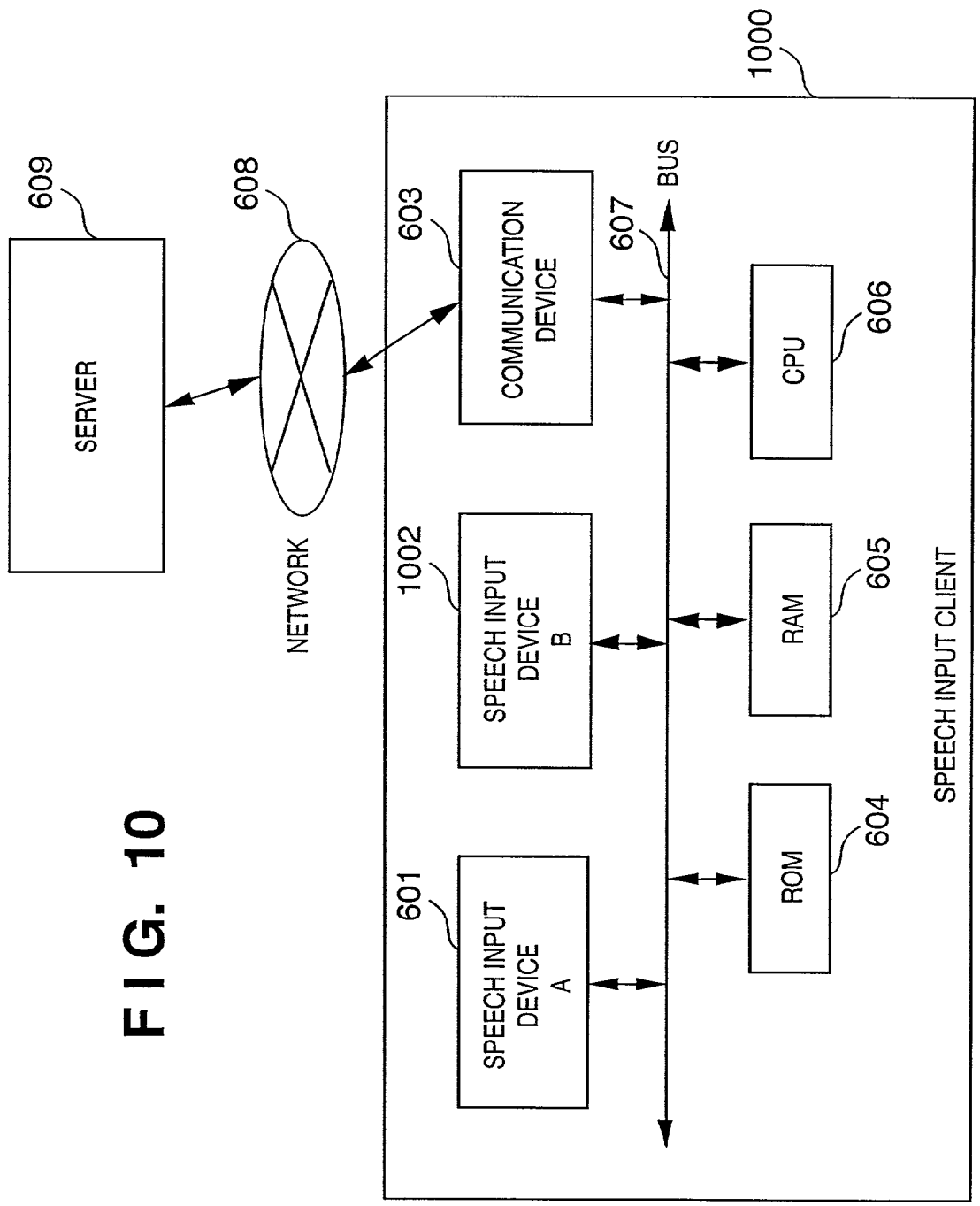
FIG. 10 is a block diagram showing the basic arrangement of an embodiment when a plurality of speech input devices are provided to the speech input client according to the present invention.
Figure 11:
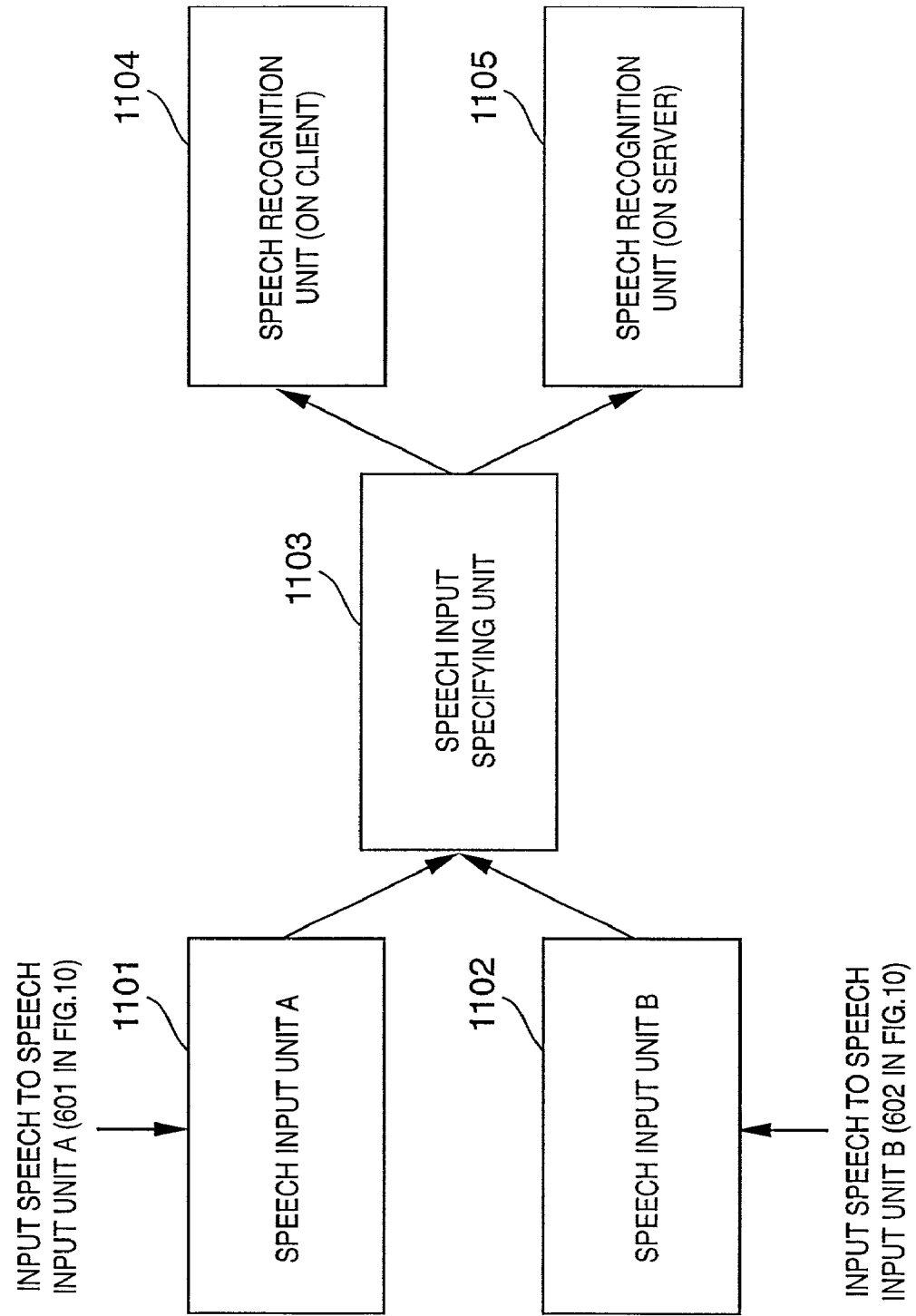
FIG. 11 is a block diagram showing the basic arrangement of an embodiment when a plurality of speech input devices are provided to the speech input client according to the present invention.

In the second embodiment, the switching instruction is received, but the reception unit may be omitted. For example, a system arrangement shown in FIG. 10 may be adopted. More specifically, a speech input device 1002 is prepared in a speech input client 1000 in place of the input device 602 shown in FIG. 6. At this time, a speech input device used to input speech is specified using a speech input specifying unit 1103, as shown in FIG. 11. If speech is input to a speech input unit A 1101, a speech recognition unit 1104 of the speech input client 1000 executes speech recognition; if speech is input to a speech input device B 1102, a speech recognition unit 1105 on a server executes speech recognition. In this way, speech recognition units can be switched. When a plurality of servers are present, a required number of speech input devices may be added.

[Ninth Embodiment]

In the second embodiment, the speech recognition destination switching unit 502 and switching instruction reception unit 503 are incorporated in the speech input client. However, the present invention is not limited to such specific arrangement. For example, the speech recognition destination switching unit 502 and switching instruction reception unit 503 may be arranged anywhere in a server or another computer connected via the network. For example, when the speech recognition destination switching unit 502 and switching instruction reception unit 503 are arranged in the server, the following arrangement is adopted.

That is, when the speech input client comprises a GUI displayed on a browser, and the server comprises a script or program (object) used to switch a recognition destination, the script (switching instruction reception unit 503) for selecting a speech recognition unit is as shown in FIG. 12.

This script can be displayed on the browser of the speech input client, as shown in FIG. 13. Therefore, the user can issue a switching instruction of the speech recognition unit by clicking a link "recognition engine 1" or "recognition engine 2".

FIG. 14 shows a speech recognition selection script, which has a name "engine1.asp" (although "engine2.asp" is required for another engine, that script is not shown since it has similar contents). By interpreting this script, the system operates as a speech recognition unit. "ASRSW" is a program (object, speech recognition destination switching unit 502) for switching a speech recognition destination, and starts operation by "Server.CreateObject".

Then, the speech recognition unit is switched by "objAsrswitch.changeEngine". In this case, "engine1" is selected. Upon executing this line, if switching has succeeded, "1" is returned to a variable ret; if switching has failed, "−1" is returned. By discriminating the value ret, display of a display script rewritten after an <HTML> tag is switched. In this way, display indicating if the switching instruction has failed or succeeded, and the speech recognition unit selected is returned to the user.

[Another Embodiment]

In the above embodiment, the programs are held in the ROM. However, the present invention is not limited to such specific arrangement, and the programs may be held in other arbitrary storage media. Or the functions of the programs may be implemented by a circuit that can implement the same operation.

[Still Another Embodiment]

Note that the present invention may be applied to either a system constituted by a plurality of devices, or an apparatus consisting of a single equipment. The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

[Yet Another Embodiment]

As the recording medium for supplying the program code, for example, a floppy disk, hard disk, optical disk, magneto-optical disk, CD-ROM, CD-R, DVD-ROM, DVD-RAM, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

The invention claimed is:

1. A speech recognition apparatus comprising:
   storage means for storing a keyword corresponding to an external speech recognition apparatus;
   first receiving means for receiving speech information;
   decision means for deciding whether or not the speech information received by said receiving means includes a keyword stored in said storing means;
   second receiving means for, if said decision means decides that the speech information includes a keyword stored in said storage means, sending the speech information except for the keyword portion to an external speech recognition apparatus corresponding to the keyword, and receiving a speech recognition result from the external speech recognition apparatus; and
   speech recognition means for, if said decision means decides that the speech information does not include a keyword stored in said storage means, recognizing the speech information.

2. A speech recognition method performed on a speech recognition apparatus which recognizes speech information, said method comprising:

a first receiving step of receiving speech information;

a decision step of deciding whether or not the speech information received in said receiving step includes a keyword corresponding to an external speech recognition apparatus;

a second receiving step of, if said decision step decides that the speech information includes a keyword corresponding to an external speech recognition apparatus, sending the speech information except for the keyword portion to the external speech recognition apparatus corresponding to the keyword, and receiving a speech recognition result from the external speech recognition apparatus; and a speech recognition step of, if said decision step decides that the speech information does not include the keyword, recognizing the speech information.

3. A storage medium that stores a control program for making a computer implement the speech recognition method claimed in claim 2.

4. A control program for making a computer implement the speech recognition method claimed in claim 2.

* * * * *